(12) United States Patent
Farley et al.

(10) Patent No.: US 10,085,378 B2
(45) Date of Patent: Oct. 2, 2018

(54) AGRICULTURAL CHOPPER WITH MOVABLE PAN

(71) Applicant: CNH Industrial America LLC, New Holland, PA (US)

(72) Inventors: Herbert M. Farley, Elizabethtown, PA (US); Cooper W. Linde, Lancaster, PA (US); Nathan E. Isaac, Lancaster, PA (US); Austin L. Jackson, Jackson, SC (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/288,338

(22) Filed: Oct. 7, 2016

(65) Prior Publication Data
US 2017/0099772 A1 Apr. 13, 2017

Related U.S. Application Data

(60) Provisional application No. 62/239,606, filed on Oct. 9, 2015.

(51) Int. Cl.
*A01F 12/40* (2006.01)
*A01D 41/12* (2006.01)
*A01D 41/06* (2006.01)
*A01F 7/06* (2006.01)
*A01F 12/44* (2006.01)

(52) U.S. Cl.
CPC .......... *A01D 41/1243* (2013.01); *A01D 41/06* (2013.01); *A01F 7/062* (2013.01); *A01F 12/444* (2013.01); *A01F 12/446* (2013.01)

(58) Field of Classification Search
CPC ..... A01D 41/1243; A01D 41/06; A01F 12/40; A01F 7/062; A01F 12/444; A01F 12/446

USPC ..... 56/13.5, 504; 241/186.3; 460/69, 73, 80, 460/111, 112
See application file for complete search history.

(56) References Cited

U.S. PATENT DOCUMENTS

| 2,842,175 A | | 7/1958 | Thompson | |
|---|---|---|---|---|
| 3,712,309 A | * | 1/1973 | Schmitz | A01F 12/40 460/112 |
| 4,669,489 A | * | 6/1987 | Schraeder | A01F 12/40 241/186.3 |

(Continued)

FOREIGN PATENT DOCUMENTS

| EP | 0224803 A1 | 6/1987 |
|---|---|---|
| EP | 0312727 A2 | 4/1989 |
| EP | 0832552 A1 | 4/1998 |

OTHER PUBLICATIONS

European Search Report; 16192988.0-1656; dated Feb. 6, 2017.

*Primary Examiner* — Robert E Pezzuto
(74) *Attorney, Agent, or Firm* — Patrick M. Sheldrake (57) ABSTRACT

An agricultural vehicle includes a chassis defining a rear; a header carried by the chassis and configured to collect crop material from a field; a track carried by the chassis; and a shredding assembly carried by the chassis that receives crop material collected by the header. The shredding assembly includes a shredder configured to shred received crop material; and a shredder pan carried by the chassis under the shredder that includes a shred assister configured to cooperate with the shredder to shred crop material and at least one track follower in contact with the track that allows the shredder pan to move along the track toward the rear of the chassis.

17 Claims, 5 Drawing Sheets

(56) References Cited

U.S. PATENT DOCUMENTS

| | | | |
|---|---|---|---|
| 4,969,853 A | | 11/1990 | Coers |
| 5,501,635 A | | 3/1996 | Niermann |
| 6,152,820 A | * | 11/2000 | Heidjann ................ A01F 12/40 460/112 |
| 6,251,009 B1 | | 6/2001 | Grywacheski et al. |
| 7,862,413 B2 | | 1/2011 | Isaac et al. |
| 8,146,231 B2 | | 4/2012 | Farley et al. |
| 2002/0144491 A1 | | 10/2002 | Holtmann et al. |

* cited by examiner

AGRICULTURAL CHOPPER WITH MOVABLE PAN

CROSS REFERENCE TO RELATED APPLICATION

This application claims the benefit of U.S. Provisional Patent Application No. 62/239,606, entitled "Agricultural Chopper with Movable Pan" and filed Oct. 9, 2015, the contents of which are incorporated herein by reference.

FIELD OF THE INVENTION

The present invention relates to agricultural harvesters, and, more particularly, to agricultural choppers.

BACKGROUND OF THE INVENTION

An agricultural harvester known as a "combine" is historically termed such because it combines multiple harvesting functions with a single harvesting unit, such as picking, threshing, separating and cleaning. A combine includes a header, which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a shredder assembly to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine through a chopper assembly and discharged back to the field using a spreader system. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

Shredder assemblies for combine harvesters can take many forms, with the two main forms being chopper assemblies and beater assemblies. In a chopper assembly, rotatable knives cooperate with counter knives held by a chopper pan to cut non-grain crop material into finer pieces. In a beater assembly, a rotating beater typically "beats" the collected crop material against inserts held by a beater pan to accomplish free grain separation. In both cases, the collected crop material, with or without grain present, is typically shredded into smaller pieces.

Traditional shredder assemblies are difficult to service due to their location within the combine harvester. Typically, the operator wishing to service the shredder assembly must enter the rear of the combine harvester to access various components of the shredder assembly such as the counter knives of a chopper assembly or the inserts of a beater pan. This is inconvenient to the operator, because the operator must carry all necessary service tools into the combine and be careful not to misplace any tools in the combine that can interfere with operation if not removed. Further, the internal location of the shredder assembly components means that any increase in the amount of accessible space for the operator to service the components requires a decrease in the amount of space usable by the components within the combine or an overall increase in combine size.

One explored solution to make access to the shredder assembly more convenient is using a hood mounted chopper that is mounted near ground level and can be accessed from the ground. One particular problem with this approach is that the overall weight of the agricultural harvester is significantly increased to mount the chopper in this manner. Further, the weight is cantilevered rearward from the rear axle, negatively affecting the rear axle weight when considering road transport requirements.

What is needed in the art is a way to service shredder assemblies that overcomes some of the disadvantages of known shredder assemblies.

SUMMARY OF THE INVENTION

The present invention provides shredder assemblies with shredder pans that can be moved toward a rear of the combine to allow access to components of the shredder assemblies.

The invention in one form is directed to an agricultural vehicle including a chassis defining a rear; a header carried by the chassis and configured to collect crop material from a field; a track carried by the chassis; and a shredding assembly carried by the chassis that receives crop material collected by the header. The shredding assembly includes a shredder configured to shred received crop material; and a shredder pan carried by the chassis under the shredder that includes a shred assister configured to cooperate with the shredder to shred crop material and at least one track follower in contact with the track that allows the shredder pan to move along the track toward the rear of the chassis.

The invention in another form is directed to an agricultural vehicle including a chassis defining a rear; a header carried by the chassis and configured to collect crop material from a field; and a shredding assembly carried by the chassis that receives crop material collected by the header. The shredding assembly includes a shredder configured to shred received crop material; and a shredder pan carried by the chassis under the shredder and including a retractable shred assister configured to cooperate with the shredder to shred crop material. The shredder pan is configured to be moved toward the rear of the chassis and the retractable shred assister is configured to retract away from the shredder independently of the shredder pan moving toward the rear of the chassis.

The invention in yet another form is directed to a method of preparing an agricultural vehicle to be serviced including the steps of providing a shredder assembly having a shredder pan with a bottom, the shredder pan being locked in an operating position where the bottom of the shredder pan is inaccessible to an operator; unlocking the shredder pan so that the shredder pan is movable; and moving the shredder pan toward a rear of the agricultural vehicle to a servicing position where the bottom of the shredder pan is accessible to an operator standing outside the agricultural vehicle and the shredder pan is still carried by the agricultural vehicle.

An advantage of the present invention is the shredder pan and associated shredding assembly components can be moved toward a rear of the agricultural vehicle for easy access by an operator.

Another advantage is the shredder pan can be moved toward the rear of the agricultural vehicle without needing to use any special tools.

Yet another advantage is the shredder pan moving to the rear of the agricultural vehicle allows an operator to access shredding assembly components associated with the shredder pan without having to enter the inside of the agricultural vehicle.

Yet another advantage is the shredding assembly can include an integral shredder to reduce the overall weight of the agricultural vehicle and provide a better weight distribution for road transport.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
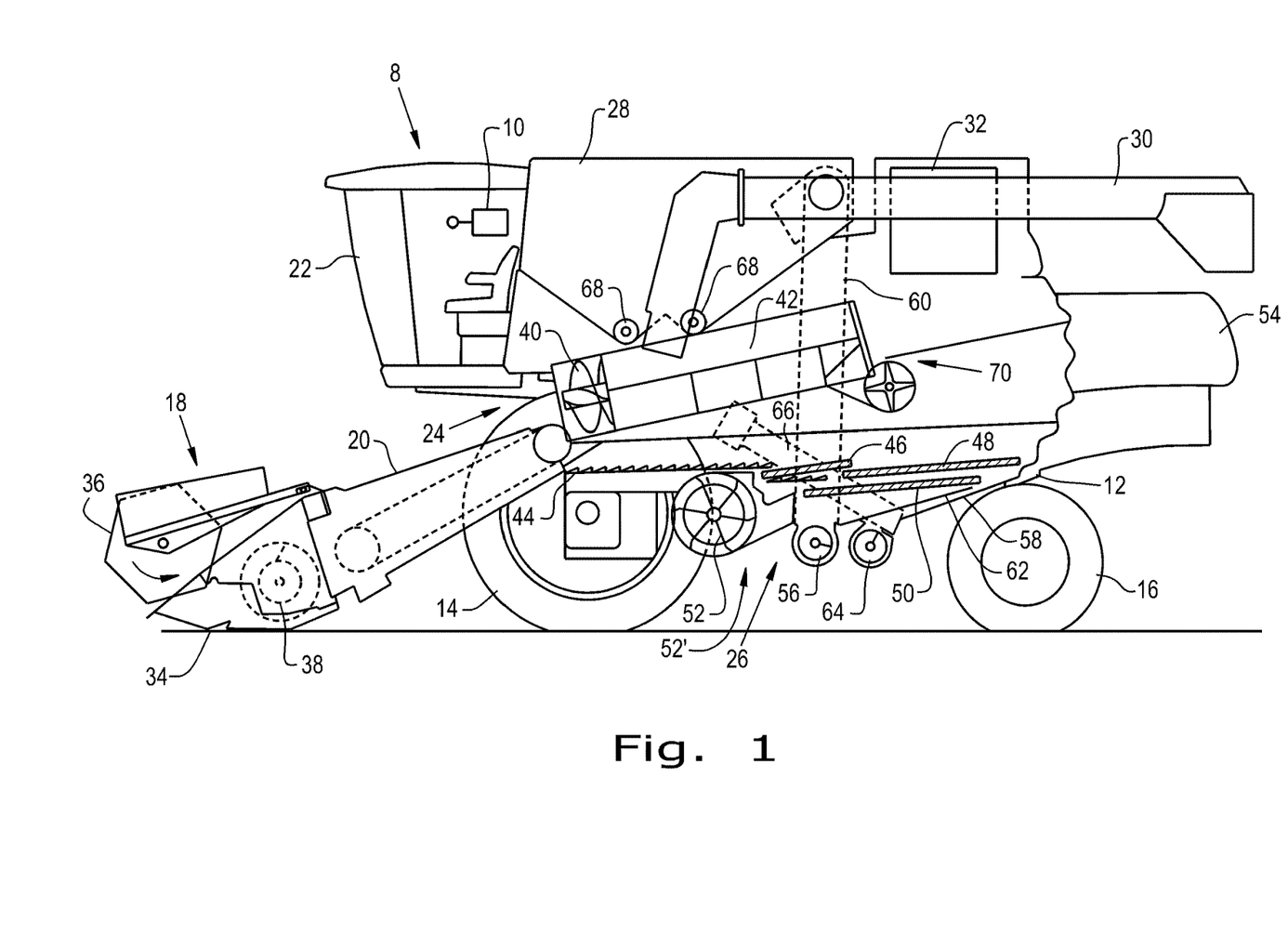
FIG. 1 is a side view of an embodiment of an agricultural vehicle according to the present invention.

Referring now to the drawings, and more particularly to FIG. 1, there is shown an agricultural vehicle in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Near a rear of the vehicle 10, a shredding assembly 70 is included that can receive crop material from the rotor 40, or other sources, and shred the crop material into finer pieces. It should be appreciated that the shredding assembly 70 can shred the crop material into finer pieces using any type of shredding action such as cutting, abrasion, tearing, etc.

Figure 2:
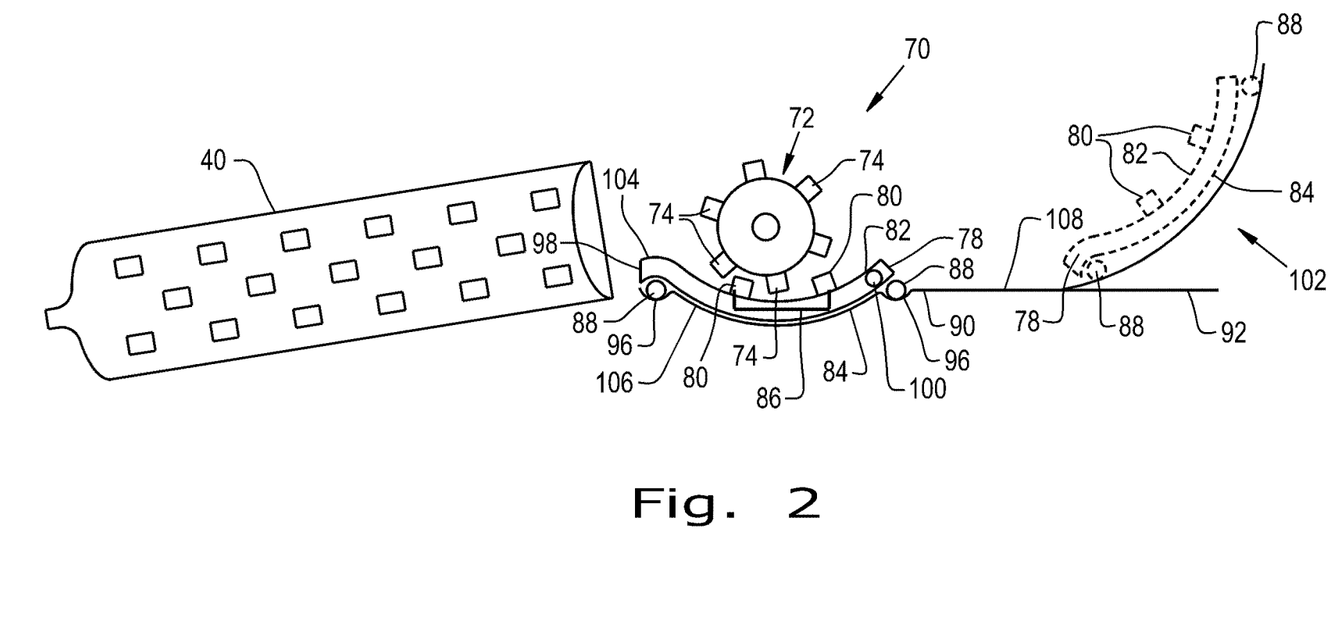
FIG. 2 is a side sectional view of an embodiment of a shredding assembly according to the present invention with a shredder pan in an operating position, the shredder pan being illustrated in a servicing position in dashed lines.

Referring now to FIG. 2, an embodiment of the shredding assembly 70 is shown that includes a shredder 72, shown as a plurality of rotating knives 74 carried by a shredder shaft 76, and a shredder pan 78 carried under the shredder 72. The shown shredder 72 is therefore a "chopper" style shredder that utilizes the rotating knives 74 cooperating with counter knives 80 mounted to the shredder pan 78 to cut the received crop material into finer pieces. While the shredding assembly 70 is shown as receiving crop material from the rotor 40, the shredding assembly 70 can be placed in a variety of other locations within the agricultural vehicle 10 to shred crop material that has been collected by the header 18. Further, while the shredding assembly 70 is shown as including a chopper style shredder 72, the shredding assembly 70 can also include a beater style shredder that cooperates with inserts mounted to the shredder pan in order to shred crop material and allow free grain separation.

The shredder pan 78 has a top 82 that faces the shredder 72 and a bottom 84 opposite the top 82 that does not face the shredder 72. In some instances, it may be desired by the operator to switch the shredding assembly 70 from a chopping mode, as shown in FIG. 2, to a non-chopping mode. To do this, the operator can activate a linkage 86 mounted to the bottom 84 of the shredder pan 78 to retract the counter knives 80 underneath the top 82 of the shredder pan 78, preventing the counter knives 80 from cooperating with the rotating knives 74 to chop the crop material. Such linkages are known in the art and any suitable linkage can be chosen that allows the counter knives 80 to be selectively retracted.

Figure 5:
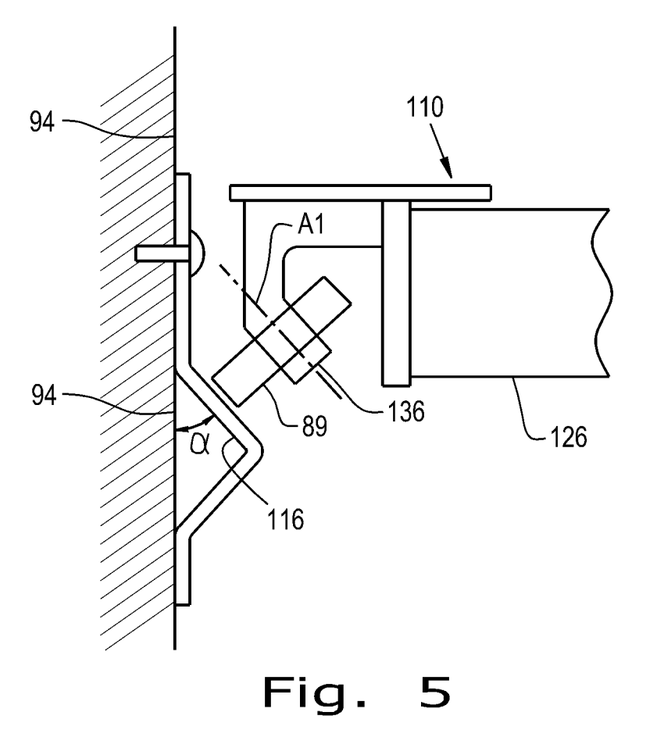
FIG. 5 is a close-up perspective view of the shredder pan shown in FIGS. 3-4 with a track follower in contact with a track.

In order to allow the counter knives 80 and/or linkage 86 to be easily serviced, the shredder pan 78 can have one or more track followers 88, shown as rollers, connected to the shredder pan 78 that contact a track 90 and allow the shredder pan 78 to be moved along the track 90 toward a rear 92 of the vehicle 10. The track 90 can be carried by the chassis 12 within the vehicle 10 in any desired fashion, such as by mounting the track 90 to a side sheet 94, as shown in FIG. 5. While two track followers 88 are shown as rollers, the shredder pan 78 can have one track follower or more than two track followers, such as four track followers, with the track follower(s) being mounted to the shredder pan 78 at a position that allows the shredder pan 78 to be stable during movement. If the shredder pan 78 has one track follower, for example, the track follower can be mounted on a center line of the shredder pan 78. If the shredder pan 78 has four track followers, each track follower can be mounted to a different corner of the shredder pan 78. Further, the track followers 88 can also be formed as sliding pads formed of a low friction material, such as high-density polyethylene or nylon, that will slide across the track 90, rather than rolling, to allow the shredder pan 78 to move toward the rear 92 of the vehicle 10. The track followers 88 can rest within one or more recesses 96 formed in the track 90 when the shredder pan 78 is in an operating position in order to prevent the shredder pan 78 from easily rolling across the track 90 and locking the shredder pan 78 in the operating position. Further, a stop 98 can be placed at a front of the track 90 that prevents the shredder pan 78 from moving toward a front of the vehicle 10 toward the rotor 40. Alternatively, the shredder pan 78 can be locked in the operating position using a pin or other element that can be placed through the side sheet 94 of the vehicle 10 and through a slot 100 formed in the shredder pan 78 to prevent the shredder pan 78 from being able to freely move when the shredder pan 78 is in the operating position, which is more fully described below.

When it is desired to access the bottom 84 of the shredder pan 78 to access components of the shredding assembly 70, the shredder pan 78 can be unlocked from the operating position by pushing and/or pulling the shredder pan 78 with sufficient force for the rollers 88 to clear the recesses 96 formed in the track 90. This allows the rollers 88 to contact relatively flat shaped portions of the track 90 that the rollers 88 can easily roll along to move the shredder pan 78 toward the rear 92 of the vehicle 10. If a pin is used to lock the shredder pan 78 in place, rather than the recesses 96 in the track 90, the pin can be pulled out of the slot 100 of the shredder pan 78 to allow the shredder pan 78 to move. After the shredder pan 78 has been unlocked from the operating position, the shredder pan 78 can then be moved along the track 90 toward the rear 92 of the vehicle 10, shown in FIG. 2 by the shredder pan 78 illustrated in dashed lines, where a rear opening 102 can be that allows an operator to easily access the bottom 84 of the shredder pan 78 from outside of the agricultural vehicle 10. As can be seen, the rollers 88 following the track 90 not only allows the shredder pan 78 to be moved rearwardly toward the rear opening 102, but vertically upward to angle the shredder pan 78 to allow easier access to the bottom 84 of the shredder pan 78. Once the shredder pan 78 has been moved to the servicing position, a stopping mechanism, such as a pin placed through the slot 100 of the shredder pan 78, can be employed to stably keep the shredder pan 78 in the servicing position while the operator services the component(s) of the shredding assembly 70. It should be appreciated that the shredder pan 78 can be moved manually by an operator or by an electro-mechanical actuator toward and away from the rear 92 of the vehicle 10.

As can be seen in FIG. 2, the shredder pan 78 can have a concave shape that fits around the circumference of the chopper 72, i.e., the traveled path of the rotating knives 74 as the shredder shaft 76 rotates. This shape puts the received crop material closer to the rotating knives 74 so the motion of the rotating knives 74 can carry the crop material to the counter knives 80 and chop the crop material. Even when the counter knives 80 are retracted below the top 82 of the shredder pan 78, a portion of the shredder pan 78, such as front end 104, can have a vertical position that would cause the shredder pan 78 to contact one or more of the rotating knives 74 as the shredder pan 78 moves toward the rear 92 of the vehicle 10. Such contact can damage the shredder pan 78 and/or contacted rotating knives 74. To avoid such contact, the track 90 can be shaped to have a curved portion 106, as can be seen, so the front end 104 of the shredder pan 78 vertically moves below the lowest rotating knife 74 to avoid contact with the rotating knives 74. The length of the curved portion 106 can be similar to the length of the shredder pan 78, so that the front end 104 of the shredder pan 78 travels an entirety of the curved portion 106 to clear any potential contact with one or more rotating knives 74. After the front end 104 travels the length of the curved portion 106, with the rear recess 96 defining the end of the curved portion 106, the entirety of the shredder pan 78 can travel across a straight portion 108 of the track 90 toward the rear 92 of the vehicle 10.

Figure 3:
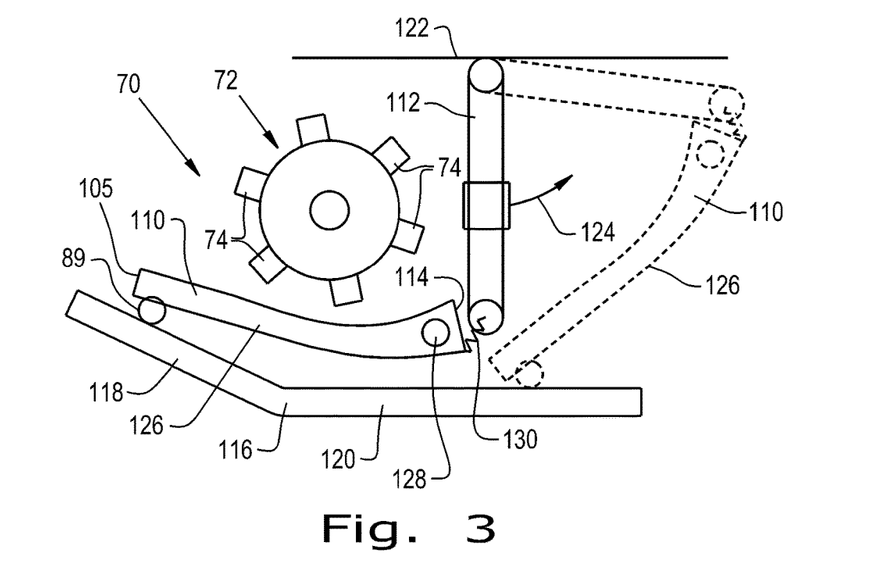
FIG. 3 is a side sectional view of another embodiment of a shredding assembly according to the present invention with a shredder pan in an operating position, the shredder pan being illustrated in a servicing position in dashed lines.
Figure 4:
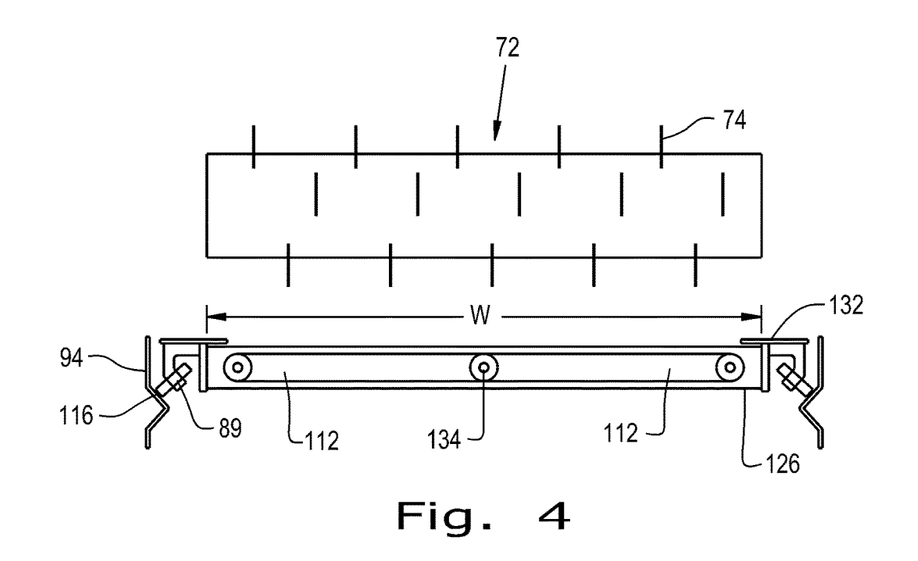
FIG. 4 is a rear view of the shredder pan shown in FIG. 3 with collapsed linkages.

In another embodiment of the present invention, and referring now to FIG. 3, a shredder pan 110 can have one or more track followers 89 at a front end 105 of the shredder pan 110 and be connected to one or more linkages 112 at a back end 114 of the shredder pan 110. As can be seen, the shredder pan 110 is part of a chopper assembly, but has counter knives that are retracted and therefore not seen in the illustration. The track follower(s) 89 can be in contact with a track 116 having an angled portion 118 and a straight portion 120 that allows the track follower(s) 89 to move across the track 116 and avoid the rotating knives 74, similarly to the track 90 shown in FIG. 2. The linkages 112, shown as two linkages in FIGS. 3-4, are pivotally connected to a surface 122 carried by the chassis 12, with pivoting of the linkages 112 causing movement of the shredder pan 110. As can be seen, the linkages 112 can be pivotally connected to a top surface 122 that is carried by the chassis 12 above the chopper 72. The linkages 112 can be generally orthogonal to the top surface 122 when the shredder pan 110 is in the operating position and generally parallel or angled relative to the top surface 122 when the shredder pan 110 is in the servicing position, which can be seen by the linkages 112 and shredder pan 110 illustrated in dashed lines in FIG. 3. If desired, the linkages 112 can also be angled relative to the top surface 122 when the shredder pan 110 is in the operating position to allow for the desired amount of pivoting. To move the shredder pan 110 from the operating position to the servicing position, the linkages 112 can be pivoted toward a rear of the vehicle 10, indicated by pivoting arrow 124, so the shredder pan 110 moves with the linkages 112 toward the rear 92 of the vehicle 10, allowing an operator access to a bottom 126 of the shredder pan 110 through the rear opening 102 of the vehicle 10. As can be seen, the pivoting movement of the linkages 112 not only moves the shredder pan 110 toward a rear of the vehicle 10, but also vertically lifts the shredder pan 110 to hold the shredder pan 110 at an angle and allow easy access to the bottom 126 of the shredder pan 110. The linkages 112, therefore, provide the pulling force needed to move the shredder pan 110 toward the rear and the track followers 89 allow smooth rolling and/or sliding of the front end 105 of the shredder pan 110 across the track 116 to reduce wear of the shredder pan 110. The shredder pan 110 can be locked in the operating position by inserting a pin (not shown) through a slot 128 formed in the shredder pan 110 to prevent movement of the shredder pan 110. Alternatively, the linkages 112 can be locked in place to prevent pivoting of the linkages 112, and therefore movement of the shredder pan 110. While two linkages 112 are shown as being connected to the shredder pan 110, one linkage at each corner of the shredder pan 110, fewer or more linkages can be connected to the shredder pan 110 to accomplish the same type of motion. One such example is connecting four linkages to the shredder pan to produce a four-bar linkage that will allow the shredder pan to swing under the chopper 72 into the servicing position.

In some instances, a heavy load may be exerted on the shredder pan 110 from an excessive amount of crop material accumulating on the shredder pan 110. To lower the risk of complications in the event of such accumulation, an energizer 130, shown as a spring, can link the shredder pan 110 to the linkages 112 to allow vertical displacement of the shredder pan 110 when a threshold load is applied to the shredder pan 110. Once the threshold load is applied to the shredder pan 110, the spring 130 can lengthen to allow the shredder pan 110 to be vertically displaced toward the track 116. Once the threshold load is removed from the shredder pan 110, the spring 130 can raise the shredder pan 110 back to the previous position.

When the shredder pan 110 has been moved to the operating position, and referring now to FIG. 4, it may be desired for the linkages 112 to be detached from the top surface 122 so the linkages 112 do not provide possible interference with crop material that is moving through the chopper 72. To accomplish this, the linkages 112 can be reversibly attached to the top surface 122 such that the linkages 112 can be disconnected from the top surface 122 and pivoted along a width W of the shredder pan 110 to collapse below a top 132 of the shredder pan 110, as shown in FIG. 4. The linkages 112 can both rest on a holder 134 connected to the bottom 126 of the shredder pan 110 that will prevent excessive pivoting of the linkages 112 and support the linkages 112 when the linkages 112 are collapsed. The linkages 112 can then be pivoted back toward the top surface 122 and reconnected to the top surface 122 to allow the shredder pan 110 to move between the operating position and servicing position. Alternatively, the linkages 112 can be reversibly connected to the shredder pan 110 and disconnected from the shredder pan 110 to allow pivoting of the linkages 112 toward the top surface 122 to a storage position. The linkages 112 can then be pivoted back toward the shredder pan 110 and reconnected to the shredder pan 110 when it is desired to move the shredder pan 110 from the operating position to the servicing position.

As can be further seen in FIGS. 4 and 5, the track 116 can be mounted to the side sheet 94 of the vehicle 10 and be an angled flange. The flange 116 can form a flange angle α relative to the side sheet 94 so that crop material does not tend to accumulate on the flange 116 but tends to drop off the flange 116. The flange angle α can be any suitable angle that reduces the chance for crop material particles to accumulate on the flange 116, with a flange angle of 30 to 60 degrees being found as useful angle measurements. The track followers 89 of the shredder pan 110, shown as rollers, can thus roll across the flange 116 with a reduced risk of getting caught on crop material particles or having crop material particles interfere with the rotation of the rollers 89 about a roller axis A1 defined by a roller axle 136. While the track 116 is shown as being mounted to the side sheet 94, it is also contemplated that the side sheet 94 can carry a series of rollers or a sliding surface that are shaped to fit in a track formed in the shredder pan 110 to allow the shredder pan 110 to slide along the rollers or sliding surface.

Figure 6:
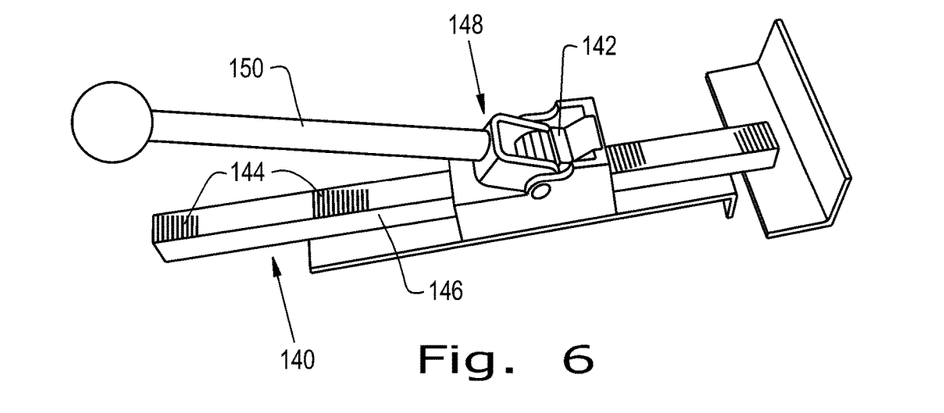
FIG. 6 is a perspective view of another embodiment of a track and a track follower according to the present invention.

Referring now to FIG. 6, another embodiment of a track 140 and a track follower 142 that can be used according to the present invention is illustrated. The track 140 can be similar to previously shown and described tracks 90 and 116, but have teeth 144 formed in a track surface 146 of the track 140. The teeth 144 can be angled with respect to the track surface 146 and allow the track follower 142, which is connected to a shredder pan (not illustrated), to move along the teeth 144 in order to move the shredder pan. The track follower 142 can be, for example, a cog or gear included on the shredder pan that will mesh with the teeth 144 of the track 140. The track follower 142 can be moved by, for example, a ratcheting mechanism 148 with a handle 150 that can be activated to move the track follower 142 along the teeth 144. The ratcheting mechanism 148 can also be replaced by, for example, a rotating handle or other construction that allows the track follower 142 to mesh with and move along the teeth 144 of the track 140. Using a toothed track 140 with a track follower 142 that interacts with the toothed track 140 can provide a self-locking movement for the shredder pan and also reduce the force needed to move the shredder pan back, due to the mechanical advantage provided by the ratcheting mechanism 148. The toothed track 140 can also be carried by the chassis 12 on the exterior of the vehicle 10 to keep the toothed track 140 free of crop material debris that could get lodged in between the teeth 144 of the track 140.

Figure 7:
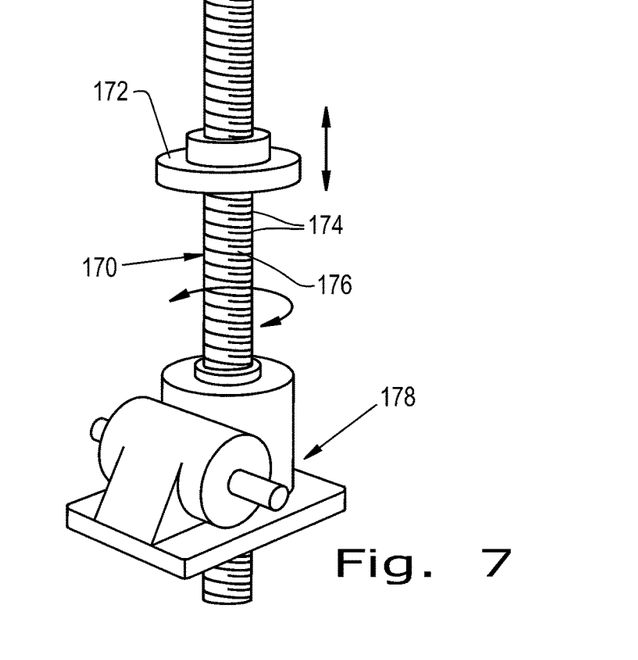
FIG. 7 is a perspective view of yet another embodiment of a track and a track follower according to the present invention.

Referring now to FIG. 7, another embodiment of a track 170 and a track follower 172 that can be used according to the present invention is illustrated. The track 170 can be an elongated screw with threads 174 formed along an outer surface 176 of the screw 170 that the track follower 172 can move along as the screw 170 rotates. The track follower 172 can be, for example, a threaded nut that is attached to a shredder pan (not shown) and will move along the threads 174 of the screw 170 as the screw 170 rotates. In other words, rotational motion of the screw 170 and threads 174 produce linear movement of the track follower 172 along the screw 170, allowing the shredder pan to linearly move along the length of the screw 170. The screw 170 can be rotated by, for example, an electric actuator 178 or a handle that is rotated by an operator. To prevent jamming of the track follower 172 on the screw 170, the pitch of the screw 170 can be adjusted to be small enough that the risk of crop material impacting between the threads 174 is minimal.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
a chassis configured to support a header that is configured to collect crop material from a field;
a track carried by said chassis; and
a shredding assembly carried by said chassis that receives crop material collected by said header, said shredding assembly including:
a shredder configured to shred received crop material; and
a movable shredder pan carried by said chassis under said shredder in an operating position and including a shred assister configured to cooperate with said shredder to shred crop material and at least one track follower in contact with said track affecting an orientation of the shredder pan during movement of said shredder pan along said track toward a rear of said chassis.

2. The agricultural vehicle according to claim 1, wherein said at least one track follower is at least one of a roller, a sliding pad, a gear, a cog, and a threaded nut.

3. The agricultural vehicle according to claim 1, wherein said at least one track follower comprises at least two track followers.

4. The agricultural vehicle according to claim 1, further comprising a surface carried by said chassis above said shredder, said shredder pan including at least one linkage connected to a back of said shredder pan and pivotally connected to said surface.

5. The agricultural vehicle according to claim 4, wherein said at least one track follower is connected to a front of said shredder pan.

6. The agricultural vehicle according to claim 4, wherein said at least one linkage is reversibly connectable to said surface and configured to collapse below a top of said shredder pan when disconnected from said surface.

7. The agricultural vehicle according to claim 4, further comprising an energizer linking said at least one linkage to said shredder pan, said energizer configured to allow vertical displacement of said shredder pan when a threshold load is applied to said shredder pan.

8. The agricultural vehicle according to claim 1, further comprising a stop reversibly connected to said shredder pan, said stop configured to prevent rearward movement of said shredder pan.

9. The agricultural vehicle according to claim 1, wherein said track is at least one of a flange attached to a side sheet, a toothed track, and an elongated screw.

10. The agricultural vehicle according to claim 9, wherein said track is a flange that forms a flange angle relative to said side sheet of between 30 and 60 degrees.

11. An agricultural vehicle, comprising:
a chassis;
a header carried by said chassis and configured to collect crop material from a field;
a track carried by said chassis; and
a shredding assembly carried by said chassis that receives crop material collected by said header, said shredding assembly including:
a shredder configured to shred received crop materials; and
a movable shredder pan carried by said chassis under said shredder in an operating position and including a shred a sister configured to cooperate with said shredder to shred crop material and at least one track follower in contact with said track that allows said shredder pan to move along said track toward a rear of said chassis;
wherein said track includes an angled portion and a straight portion, wherein said at least one track follower moves along said angled portion to allow said shredder pan to clear said shredder.

12. An agricultural vehicle, comprising:
a chassis:
a header carried by said chassis and configured to collect crop material from a field;
a track carried by said chassis; and
a shredding assembly carried by said chassis that receives crop material collected by said header, said shredding assembly including:
a shredder configured to shred received crop material; and
a movable shredder pan carried by said chassis under said shredder in an operating position and including a shred assister configured to cooperate with said shredder to shred crop material and at least one track follower in contact with said track that allows said shredder pan to move along said track toward a rear of said chassis;
wherein said track has a recess formed therein, said recess impeding free movement of said at least one track follower along said track.

13. An agricultural vehicle, comprising:
a chassis;
a header carried by said chassis and configured to collect crop material from a field;
a track carried by said chassis; and a shredding assembly carried by said chassis that receives crop material collected by said header, said shredding assembly including:
a shredder configured to shred received crop material; and
a movable shredder pan carried by said chassis under said shredder in an operating position and including a shred assister configured to cooperate with said shredder to shred crop material and at least one track follower in contact with said track that allows said shredder pan to move along said track toward a rear of said chassis;
wherein said at least one track follower also allows said shredder pan to move vertically along said track.

14. An agricultural vehicle, comprising:
a chassis; configured to carry a header to collect crop material from a field; and
a shredding assembly carried by said chassis that receives crop material collected by said header, said shredding assembly including:
a shredder configured to shred received crop material; and
a shredder pan connected to said chassis by at least one linkage, the shredder pan positioned under said shredder in an operating position and including a retractable shred assister configured to cooperate with said shredder to shred crop material, said shredder pan configured to be moved from an operating position below the shredder upward and rearward to a service position rearward of the shredder.

15. The agricultural vehicle according to claim 14, wherein said at least one linkage is connected to said shredder pan and configured to move said shredder pan toward said rear of said chassis.

16. The agricultural vehicle according to claim 15, wherein said at least one linkage is pivotally connected to a surface above said shredder.

17. The agricultural vehicle according to claim 14, wherein said at least one linkage includes at least two linkages, each of said at least two linkages being connected to a respective corner of said shredder pan.

\* \* \* \* \*